(12) United States Patent
Otsuki et al.

(10) Patent No.: US 12,553,873 B2
(45) Date of Patent: Feb. 17, 2026

(54) EXHAUST GAS ANALYZING DEVICE, GAS SUPPLY METHOD, AND EXHAUST GAS SAMPLING DEVICE

(71) Applicant: HORIBA, LTD., Kyoto (JP)

(72) Inventors: Yoshinori Otsuki, Darmstadt (DE); Huewe Florian, Darmstadt (DE); Kenji Kondo, Kyoto (JP)

(73) Assignee: HORIBA, LTD. (JP)

( * ) Notice: Subject to any disclaimer, the term of this patent is extended or adjusted under 35 U.S.C. 154(b) by 308 days.

(21) Appl. No.: 17/615,205

(22) PCT Filed: May 25, 2020

(86) PCT No.: PCT/JP2020/020448
§ 371 (c)(1),
(2) Date: Nov. 30, 2021

(87) PCT Pub. No.: WO2021/014740
PCT Pub. Date: Jan. 28, 2021

(65) Prior Publication Data
US 2022/0229032 A1    Jul. 21, 2022

(30) Foreign Application Priority Data
Jul. 22, 2019 (JP) .................. 2019-134703

(51) Int. Cl.
*G01N 33/00* (2006.01)
*G01N 1/22* (2006.01)
*G01N 15/06* (2024.01)

(52) U.S. Cl.
CPC ....... *G01N 33/0006* (2013.01); *G01N 1/2205* (2013.01); *G01N 1/2252* (2013.01); *G01N 15/065* (2013.01); *G01N 33/0018* (2013.01)

(58) Field of Classification Search
CPC .......... G01N 33/0006; G01N 33/0018; G01N 33/00693; G01N 1/2205; G01N 1/2252;
(Continued)

(56) References Cited

U.S. PATENT DOCUMENTS 5,184,501 A * 2/1993 Lewis .................. G01N 1/2252
                                                    73/23.31
5,756,360 A * 5/1998 Harvey .............. G01N 33/0006
                                                    73/23.31

(Continued)

FOREIGN PATENT DOCUMENTS

EP    0882227 A     12/1998
EP    0882227 B1    4/2009
(Continued)

OTHER PUBLICATIONS

EESR dated Jun. 19, 2023 issued in EP patent application No. 20843635.2.
(Continued)

*Primary Examiner* — Helen C Kwok
(74) *Attorney, Agent, or Firm* — Brooks Kushman P.C.

(57) ABSTRACT

In order to allow an analyzer to be calibrated or a sampling channel to be purged without removing a sampling probe from a sampling location, provided are a sampling channel through which an exhaust gas from an internal combustion engine flows, an analyzer that is connected to the sampling channel and analyzes the exhaust gas, a diluter provided upstream of the analyzer in the sampling channel, a recirculated channel that branches from a branch point set between the analyzer and the diluter in the sampling channel and joins the diluter, a pump that is provided in the recirculated channel and guides part of the exhaust gas from the branch point to the diluter, an additional channel that is connected to the recirculated channel or the sampling channel and through which a calibration gas or a purge gas flows, (Continued)

and an opening and closing mechanism provided in the additional channel.

11 Claims, 9 Drawing Sheets

(58) Field of Classification Search
CPC ......... G01N 2015/0046; G01N 15/065; G01N 2001/2255; G01N 2001/227
See application file for complete search history.

(56) References Cited

U.S. PATENT DOCUMENTS

| | | | | |
|---|---|---|---|---|
| 6,200,819 B1* | 3/2001 | Harvey | ............... | G01N 33/0018 73/23.31 |
| 6,370,936 B1* | 4/2002 | Yamagishi | ......... | G01N 15/0618 73/863.03 |
| 2001/0049973 A1* | 12/2001 | Hanashiro | ............ | G01N 1/2258 73/863.11 |
| 2003/0167859 A1* | 9/2003 | Dickson | ................ | G01N 1/2252 73/863.02 |
| 2006/0243026 A1* | 11/2006 | Graze | ................. | G01M 15/102 73/23.31 |
| 2007/0251307 A1* | 11/2007 | Graze | ................. | G01N 1/2252 73/114.69 |
| 2010/0101302 A1* | 4/2010 | Graze, Jr. | ............ | G01N 1/2252 73/23.31 |
| 2012/0017666 A1* | 1/2012 | Otsuki | ................ | G01M 15/102 73/23.33 |
| 2012/0090377 A1* | 4/2012 | Matsuyama | ......... | G01N 1/2252 73/23.33 |
| 2012/0174989 A1* | 7/2012 | Otsuki | ................. | G01N 1/2252 73/23.31 |
| 2012/0266687 A1* | 10/2012 | Takahashi | ............ | G01N 1/2252 73/861 |
| 2015/0075135 A1* | 3/2015 | Giechaskiel | ......... | G01N 1/2252 60/276 |
| 2016/0115850 A1* | 4/2016 | Otsuki | .................... | F04B 45/04 73/114.71 |
| 2016/0312682 A1* | 10/2016 | Otsuki | .................... | F01N 13/08 |
| 2016/0319726 A1* | 11/2016 | Otsuki | ................. | G01N 1/2252 |
| 2018/0340461 A1* | 11/2018 | Otsuki | ...................... | G01N 1/44 |
| 2019/0113422 A1* | 4/2019 | Otsuki | ................. | G01N 1/2205 |
| 2019/0162636 A1* | 5/2019 | Mölter | ................. | B01F 25/314 |

FOREIGN PATENT DOCUMENTS

| | | |
|---|---|---|
| JP | 2003057153 A | 2/2003 |
| JP | 2010-261938 A | 11/2010 |
| JP | 2013104669 A | 5/2013 |
| JP | 2014-526679 A | 10/2014 |
| WO | WO97/31265 A | 8/1997 |
| WO | 2019-059008 A1 | 3/2019 |

OTHER PUBLICATIONS

Office Action dated Jan. 9, 2024 issued in JP patent application No. 2021-534562.
International Search Report dated Aug. 18, 2020 issued for international application No. PCT/JP2020/020448, 4 pgs.
Office Action dated Mar. 12, 2024 issued in EP patent application No. 20843635.2.

* cited by examiner

EXHAUST GAS ANALYZING DEVICE, GAS SUPPLY METHOD, AND EXHAUST GAS SAMPLING DEVICE

CROSS-REFERENCE TO RELATED APPLICATIONS

This application is the U.S. national phase of PCT Application No. PCT/JP2020/020448, filed May 25, 2020, which claims priority to Japanese Patent Application No. 2019-134703, filed Jul. 22, 2019, which are both incorporated by reference herein in their entireties.

TECHNICAL FIELD

The present invention relates to an exhaust gas analyzing device and a gas supply method that supplies gas to the exhaust gas analyzing device.

BACKGROUND ART

As a conventional exhaust gas analyzing device, as shown in Patent Literature 1, there is an exhaust gas analyzing device including a so-called recirculating dilution mechanism that includes a recirculated channel that returns part of exhaust gas flowing through a sampling channel from downstream to upstream, includes a filter in the recirculated channel, and thus returns the exhaust gas flowing into the recirculated channel to the sampling channel as a dilution gas.

In such an exhaust gas analyzing device, a zero level of the analyzer has to be checked and calibrated and the sampling channel has to be purged, for example, before and after exhaust gas analysis in order to ensure analysis accuracy.

However, in order to perform calibration and purge, the sampling probe of the sampling channel is removed from the sampling location, a filter is attached to the sampling probe, air or the like is taken in through the filter, and the zero check and purge are performed, which complicates work.

CITATION LIST

Patent Literature

Patent Literature 1: JP 2014-526679 A

SUMMARY OF INVENTION

Technical Problem

Therefore, the present invention has been made to solve the above problems at once, and a main object of the present invention is to provide an exhaust gas analyzer capable of calibrating an analyzer or purging a sampling channel without removing a sampling probe from a sampling location.

Solution to Problem

An exhaust gas analyzing device of the present invention includes a sampling channel through which exhaust gas from an internal combustion engine flows, an analyzer that is connected to the sampling channel and analyzes the exhaust gas, a diluter provided upstream of the analyzer in the sampling channel, a recirculated channel that branches from a branch point set between the analyzer and the diluter in the sampling channel and joins the diluter, a pump that is provided in the recirculated channel and guides part of the exhaust gas from the branch point to the diluter, an additional channel that is connected to the recirculated channel or the sampling channel and through which a calibration gas or a purge gas flows, and an opening and closing mechanism provided in the additional channel.

In the exhaust gas analyzing device configured as described above, the additional channel through which the calibration gas or the purge gas flows is connected to the recirculated channel or the sampling channel, and thus the calibration gas or the purge gas can flow into the recirculated channel or the sampling channel by opening the opening and closing mechanism of the additional channel. As a result, the analyzer can be calibrated or the sampling channel can be purged without removing the sampling probe of the sampling channel from the sampling location.

In order to prevent the exhaust gas from flowing into the analyzer at a time of calibration or purge, when the opening and closing mechanism is opened, part of the calibration gas or the purge gas introduced from the additional channel into the recirculated channel preferably flows to upstream of the sampling channel through the diluter.

In such a configuration, part of the calibration gas or the purge gas flows backward in the sampling channel through the diluter, it is therefore possible to prevent the exhaust gas from flowing into the analyzer.

In order to reliably cause part of the calibration gas or the purge gas to flow backward, an analysis gas flow rate as a flow rate of a gas introduced into the analyzer is preferably controlled to a first flow rate, and an additional flow rate as a flow rate of the calibration gas or the purge gas introduced from the additional channel into the recirculated channel is preferably larger than the first flow rate.

Further, a flow rate of a gas flowing from the recirculated channel to the diluter is preferably controlled to a second flow rate, and an additional flow rate as a flow rate of the calibration gas or the purge gas introduced from the additional channel into the recirculated channel is preferably smaller than the second flow rate.

A specific embodiment can be exemplified in which the analyzer analyzes a component contained in the exhaust gas in a state where the opening and closing mechanism is closed, and the calibration gas or the purge gas flows through the additional channel in a state where the opening and closing mechanism is opened.

A specific device configuration can be exemplified in which the analyzer analyzes a particulate matter in the exhaust gas, and the recirculated channel is provided with a filter that captures the particulate matter.

The filter is preferably provided upstream of the pump in the recirculated channel.

This configuration can reduce a particulate matter flowing into the pump and prevent a failure of the pump.

The additional channel is preferably connected between the pump and the filter in the recirculated channel.

In such a configuration, at a time of exhaust gas analysis, the dilution gas in which the particulate matter is captured from the exhaust gas flows through a connection of the additional channel, and contamination of the additional channel can be reduced.

In a case where atmosphere is used as the calibration gas or the purge gas, the additional channel is preferably provided with a second filter that captures a particulate matter in atmosphere, and the atmosphere having passed through the second filter as the calibration gas or the purge gas is preferably introduced into the recirculated channel from the additional channel in a state where the opening and closing mechanism is opened.

It is preferable to further include a dehumidifier provided downstream of the pump in the recirculated channel.

The calibration gas or the purge gas can be dried and allowed to flow, and this can suppress condensation of moisture contained in these gases.

A calibration method of the present invention is a method of supplying a gas to an exhaust gas analyzing device including a sampling channel through which exhaust gas from an internal combustion engine flows, an analyzer that is connected to the sampling channel and analyzes the exhaust gas, a diluter provided upstream of the analyzer in the sampling channel, a recirculated channel that branches from a branch point set downstream of the diluter in the sampling channel and is connected to the diluter, and a pump that is provided in the recirculated channel and guides part of the exhaust gas from the branch point to the diluter, the method including connecting an additional channel through which a calibration gas or a purge gas flows to the recirculated channel or the sampling channel, and guiding the calibration gas or the purge gas to the sampling channel by opening an opening and closing mechanism provided in the additional channel.

An exhaust gas sampling device of the present invention samples exhaust gas from an internal combustion engine to an analyzer, the exhaust gas sampling device including a sampling channel that is connected to the analyzer and through which the exhaust gas flows, a diluter provided upstream of the analyzer in the sampling channel, a recirculated channel that branches from a branch point set between the analyzer and the diluter in the sampling channel and joins the diluter, a pump that is provided in the recirculated channel and guides part of the exhaust gas from the branch point to the diluter, an additional channel that is connected to the recirculated channel or the sampling channel and through which a calibration gas or a purge gas flows, and an opening and closing mechanism provided in the additional channel.

Such a gas supply method and an exhaust gas sampling device make it possible to obtain effects similar to effects of the above exhaust gas analyzing device.

Advantageous Effects of Invention

The present invention configured as described above allows the analyzer to be calibrated or the sampling channel to be purged without removing the sampling probe from the sampling location.

REFERENCE SIGNS LIST

100 exhaust gas analyzing device
1 exhaust gas sampling device
L1 sampling channel
L2 recirculated channel
X analyzer
10 dilution mechanism
MIX diluter
P pump
F1 first filter
11 flow rate controller
L3 additional channel
V1 opening and closing mechanism
20 control device

DESCRIPTION OF EMBODIMENTS

Hereinafter, an embodiment of an exhaust gas analyzing device of the present invention will be described with reference to the drawings.

Figure 1:
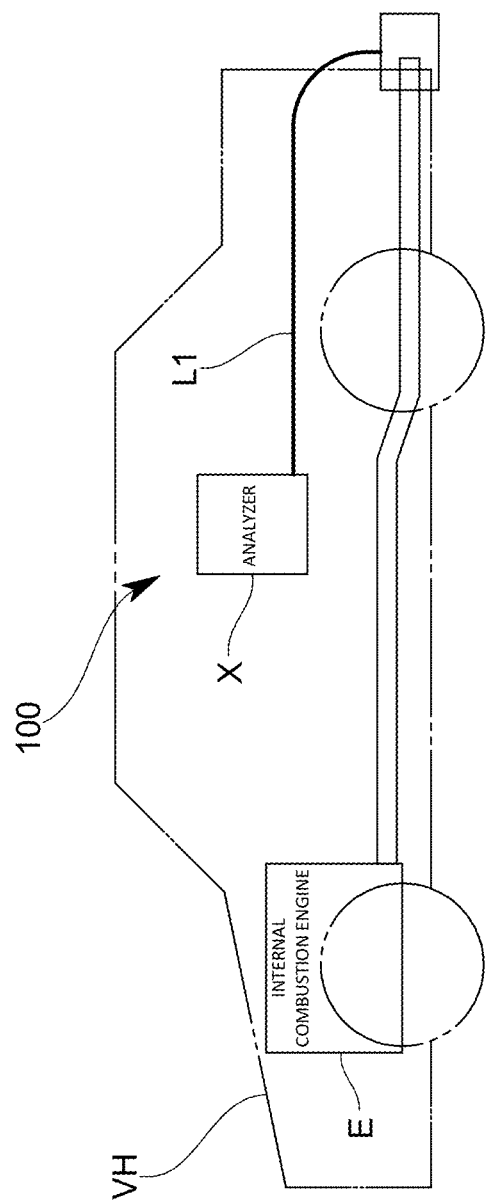
FIG. 1 is a schematic diagram illustrating a usage mode of an exhaust gas analyzing device according to an embodiment.

As shown in FIG. 1, an exhaust gas analyzing device 100 according to the embodiment is an in-vehicle device mounted in a vehicle VH. However, the exhaust gas analyzing device 100 may be a stationary device that is not mounted in the vehicle VH.

Figure 2:
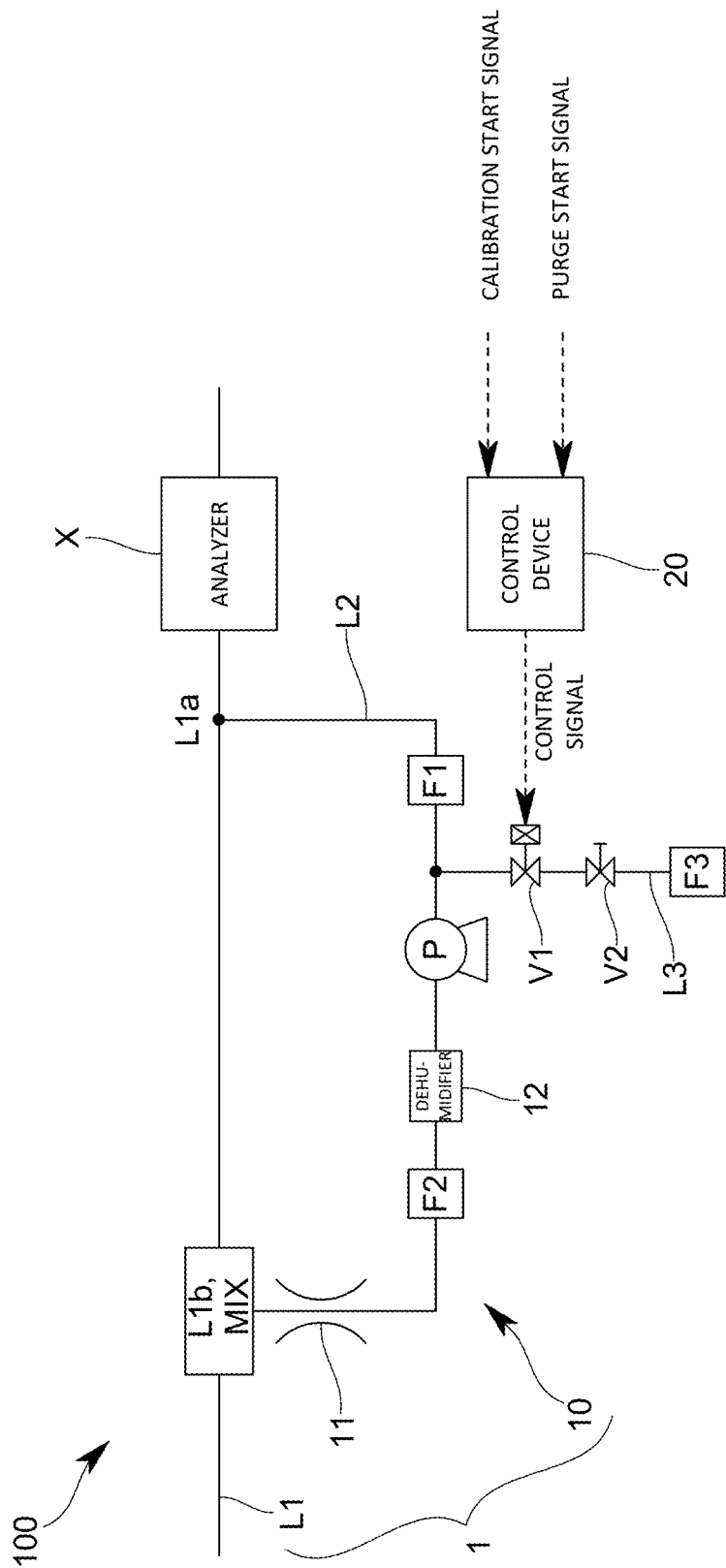
FIG. 2 is a schematic diagram illustrating a configuration of the exhaust gas analyzing device according to the embodiment.

Specifically, as illustrated in FIG. 2, the exhaust gas analyzing device 100 includes an exhaust gas sampling device 1 that samples exhaust gas discharged from an internal combustion engine E, and an analyzer X that analyzes the sampled exhaust gas.

The exhaust gas sampling device L1 includes an exhaust gas sampling channel L1 provided with a sampling probe (not illustrated) at one end, and samples part or all of the exhaust gas discharged from the internal combustion engine E by attaching the sampling probe to, for example, a sampling location near a tail pipe. Here, the sampling channel L1 is constituted partially by a heating tube unit called a hot hose, and guides the collected exhaust gas to the analyzer X while heating the exhaust gas to a predetermined temperature or maintaining the exhaust gas at a predetermined temperature.

The analyzer X is connected to the other end of the sampling channel L1 and analyzes a particulate matter contained in the exhaust gas. The analyzer X is here a particle number counting mechanism X that counts the number of particles (PN) of the particulate matter.

Figure 3:
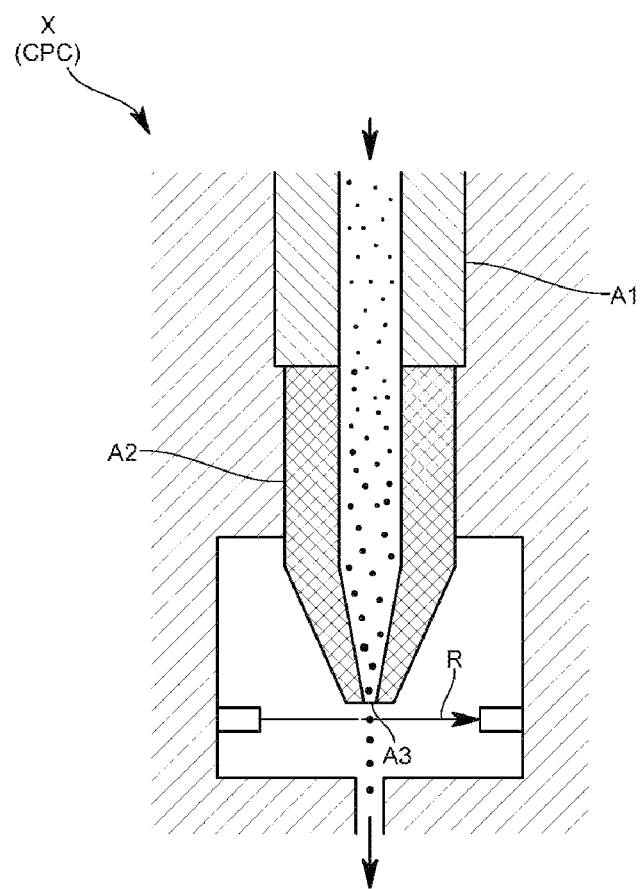
FIG. 3 is a schematic diagram illustrating a principle of an analyzer according to the embodiment.

Examples of the particle number counting mechanism include a mechanism called a condensation particle counter (CPC) as illustrated in FIG. 3. The CPC guides exhaust gas to a heater A1 including an organic gas such as alcohol or butanol, and then cools the exhaust gas in a condenser A2 to condense and adhere the organic gas to a particulate matter in the exhaust gas and grow the particulate matter to have a large diameter, discharges the grown particulate matter from a slit A3, and counts discharged particles with a laser light R. Downstream of the CPC, a critical-orifice constant flow rate unit (not shown) is provided as a flow rate controller, and a constant flow rate of gas flows through the CPC.

In a case where the particle number counting mechanism X is used, the exhaust gas has to be guided to the particle number counting mechanism after being diluted in order to prevent the particulate matter contained in the exhaust gas from aggregating with each other. In the analyzer X analyzing a component different from the particulate matter contained in the exhaust gas, the exhaust gas has to be diluted for various reasons in some cases.

Therefore, as shown in FIG. 2, the exhaust gas sampling device 1 according to the embodiment further includes a dilution mechanism 10 that dilutes sampled exhaust gas.

The dilution mechanism 10 is a so-called recirculating mechanism that samples part of the exhaust gas flowing through the sampling channel L1, removes a particulate matter (counting target) contained in the exhaust gas to obtain a dilution gas, and then returns the dilution gas to the sampling channel L1.

Specifically, the dilution mechanism 10 includes a recirculated channel L2 that branches from a branch point L1a set on the sampling channel L1, joins a junction L1b set on the sampling channel L1, and returns part of the exhaust gas flowing through the sampling channel L1 from downstream to upstream of the sampling channel L1. In the embodiment, a diluter MIX is provided at the junction L1b, and a branch point L1a is set between the diluter MIX and the analyzer X.

The recirculated channel L2 is provided with a pump P that circulates a fluid flowing through the recirculated channel L2. A first filter F1 that captures the particulate matter contained in the exhaust gas may be provided upstream of the pump P, that is, between the pump P and the branch point L1a in order to prevent a failure or the like of the pump P.

A flow rate controller 11 that controls a dilution gas flow rate as a flow rate of the dilution gas flowing into the diluter MIX from the recirculated channel L2 is provided downstream of the pump P in the recirculated channel L2, that is, between the pump P and the diluter MIX. Here, the flow rate controller 11 is a venturi as a constant flow rate unit, but for example, a mass flow controller, a flow rate adjusting valve, or the like may be used.

Furthermore, in order to prevent a particulate matter such as pump dust from being contained in the dilution gas flowing into the diluter MIX, a second filter F2 that captures the particulate matter may be provided downstream of the pump P in the recirculated channel L2, that is, between the pump P and the diluter MIX. Here, the second filter F2 is provided between the pump P and the flow rate controller 11, but may be provided between the flow rate adjuster 11 and the diluter MIX.

In addition, a dehumidifier 12 that reduces humidity of the dilution gas flowing into the diluter MIX may be provided downstream of the pump P in the recirculated channel L2, that is, between the pump P and the diluter MIX. Here, the dehumidifier 12 is provided between the pump P and the second filter F2, but may be provided between the second filter F2 and the flow rate controller 11, between the flow rate controller 11 and the diluter MIX, or upstream of the pump P.

The exhaust gas analyzing device according to the embodiment further includes an additional channel L3 connected to upstream of the pump P in the recirculated channel L2 and through which a calibration gas or a purge gas flows, and an opening and closing mechanism V1 provided in the additional channel L3. In the embodiment, the exhaust gas analyzing device 100 further includes a control device 20 that controls the opening and closing mechanism V1 to be in an open state or a closed state. When the opening and closing mechanism V1 is manually opened and closed, a function related to the control device 20 described later need not be used.

The additional channel L3 has one end into which the calibration gas or the purge gas is introduced, and the other end connected to upstream (negative pressure side) of the pump P in the recirculated channel L2. The calibration gas is a zero gas for zero check of the analyzer X, and in other words, a gas substantially not containing a particulate matter. In this embodiment, the calibration gas is also used as the purge gas.

In this embodiment, air (atmosphere) is used as the calibration gas or the purge gas, and the third filter F3 for capturing a particulate matter contained in the air is provided in the additional channel L3. Here, the third filter F3 is provided upstream of the opening and closing mechanism V1, but may be provided downstream of the opening and closing mechanism V1.

The additional channel L3 is provided with a flow rate adjusting valve V2 which is a flow rate controller that adjusts an additional flow rate as a flow rate of the calibration gas or the purge gas, and the flow rate of the calibration gas or the purge gas supplied from the additional channel L3 to the recirculated channel L2 becomes a constant flow rate. As the flow rate controller, a mass flow controller, a plurality of venturi connected in parallel to be switchable, or the like may be used.

The opening and closing mechanism V1 is switchable between an open state in which the calibration gas or the purge gas is supplied from the additional channel L3 to the recirculated channel L2 and a closed state in which the supply of the calibration gas or the purge gas is stopped. Here, the opening and closing mechanism V1 is an opening and closing valve such as an electromagnetic valve operated according to a control signal from the control device 20.

The control device 20 physically includes a CPU, an internal memory, an input and output interface, and the like, receives an analysis start signal, a calibration start signal, and a purge start signal as illustrated in FIG. 2 by cooperation of the CPU and other components on the basis of a gas supply program stored in the internal memory, and outputs a control signal to the opening and closing mechanism V1 on the basis of these signals.

Figure 4:
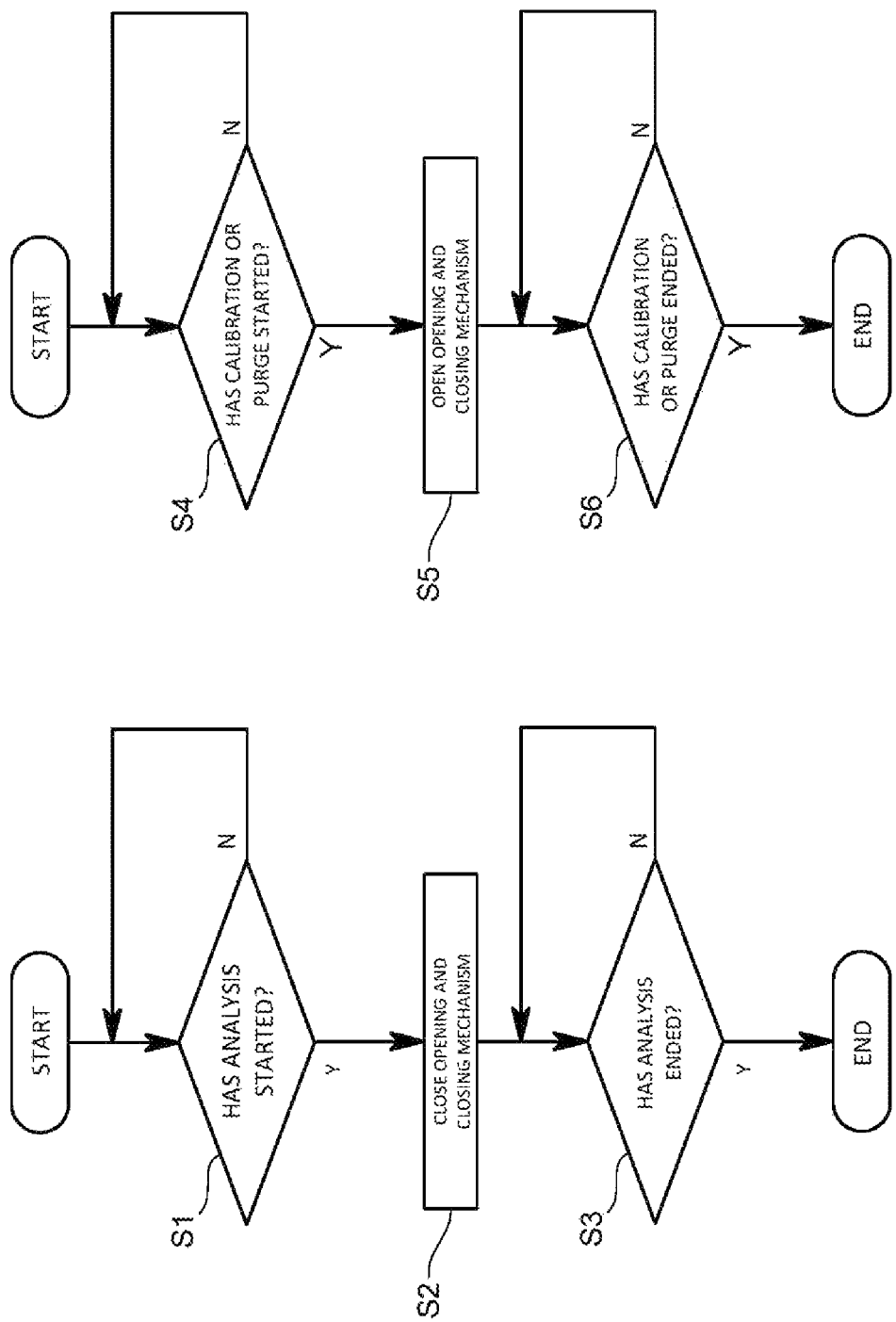
FIG. 4 is a flowchart for describing an operation of the exhaust gas analyzing device according to the embodiment.
Figure 5:
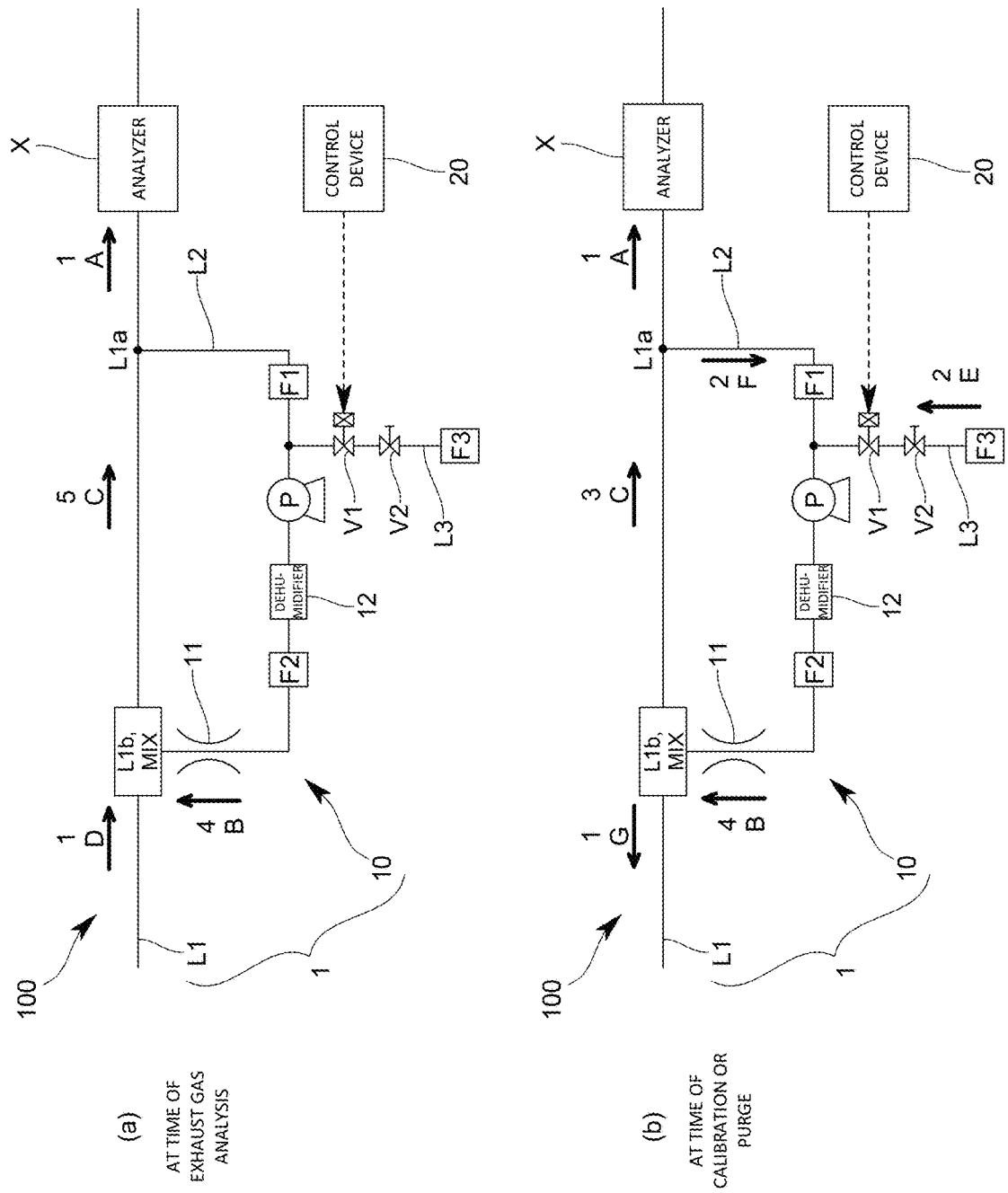
FIG. 5 is a schematic diagram for describing a gas flow rate flowing through the exhaust gas analyzing device according to the embodiment.

Hereinafter, a specific operation of the control device 20 will be described with reference to FIGS. 4 and 5.

[At Time of Exhaust Gas Analysis]

First, a start operation at a time of exhaust gas analysis will be described.

When receiving an analysis start signal input via an input interface such as a mouse, a keyboard, or a touch panel, the control device 20 outputs a control signal to the opening and closing mechanism V1 to switch the opening and closing mechanism V1 to a closed state (S1 and S2).

At this time, since the flow rate controllers are provided downstream of the analyzer X and in the recirculated channel L2 as described above, a first flow rate A (hereinafter, referred to as an analysis gas flow rate A) as a flow rate of an analysis gas guided to the analyzer X, and a second flow rate B (hereinafter, referred to as a supply flow rate B) as a flow rate of a gas supplied from the recirculated channel L2 to the diluter MIX become constant flow rates as shown in FIG. 5(a). Note that the supply flow rate B at the time of exhaust gas analysis is a supply flow rate of the dilution gas supplied from the recirculated channel L2 to the diluter MIX.

Here, as illustrated in FIG. 5(a), a third flow rate C (hereinafter, referred to as a mixed gas flow rate C) as a flow rate of a mixed gas including the exhaust gas and the dilution gas flowing from the diluter to the branch point L1a is a flow rate obtained by adding the analysis gas flow rate A and the supply flow rate B. Since the analysis gas flow rate A and the supply flow rate B are constant flow rates as described above, the mixed gas flow rate C is also controlled to a constant flow rate.

A fourth flow rate D (hereinafter, referred to as a sampling flow rate D) as a flow rate of a gas sampled from the one end of the sampling channel L1 is a flow rate of a difference between the mixed gas flow rate C and the supply flow rate B. Since the mixed gas flow rate C and the supply flow rate B are constant flow rates, the sampling flow rate D is also controlled to a constant flow rate.

Specifically, as illustrated in FIG. 5(a), for example, a case is considered where the analysis gas flow rate A is set to 1 and the dilution gas flow rate B is set to 4. In this case, the mixed gas flow rate C is 5 which is a sum of the analysis gas flow rate A and the dilution gas flow rate B, and the sampling flow rate D is 1 which is obtained by subtracting the dilution gas flow rate B from the mixed gas flow rate C. As a result, the exhaust gas sampled from the one end of the sampling channel L1 is diluted five times with the dilution gas and guided to the analyzer X.

Thereafter, the control device 20 determines whether an analysis end signal for ending the analysis is received (S3), and ends the exhaust gas analysis in a case where the analysis end signal has been received.

[At Time of Calibration or Purge]

Next, an operation at a time of calibration or purge will be described.

The calibration or purge is preferably performed before and after the exhaust gas analysis, but may be performed either before or after the exhaust gas analysis.

When receiving a calibration start signal or a purge start signal input via the input interface such as a mouse, a keyboard, or a touch panel, the control device 20 outputs a control signal to the opening and closing mechanism V1 to switch the opening and closing mechanism V1 to an open state (S4 and S5).

At this time, since the flow rate controllers are provided not only downstream of the analyzer X and the recirculated channel L2 but also in the additional channel L3, not only the analysis gas flow rate A and the supply flow rate B but also a fifth flow rate (hereinafter, referred to as an additional flow rate E) as a flow rate of the calibration gas or the purge gas supplied from the additional channel L3 to the recirculated channel L2 becomes a constant flow rate as illustrated in FIG. 5(b).

Here, in the flow rate adjusting valve V2 as the flow rate controller provided in the additional channel L3, the additional flow rate E is set to be larger than the analysis gas flow rate A. In this embodiment, since the calibration gas or the purge gas is drawn by the pump P, the additional flow rate E is smaller than the supply flow rate B.

Specifically, as illustrated in FIG. 5(b), a case will be considered where the additional flow rate is set to 2 in a case where the analysis gas flow rate A is set to 1 and the supply flow rate B is set to 4 as in the exhaust gas analysis described above.

In this case, first, a sixth flow rate (hereinafter, referred to as a branch flow rate F) as a flow rate of the gas branched from the branch point L1a of the sampling channel L1 to the recirculated channel L2 is 2 which is obtained by subtracting the additional flow rate E from the supply flow rate B. Thus, the mixed gas flow rate C becomes 3 which is a sum of the analysis gas flow rate A and the branch flow rate F. As a result, of 4 of the supply flow rate B, 3 of the mixed gas flow rate C is guided to downstream of the diluter MIX, and a seventh flow rate (hereinafter, referred to as an excess flow rate G) as a flow rate of the remaining gas is guided to upstream through the diluter MIX. That is, part of the supply flow rate B flows backward in the sampling flow rate through the diluter MIX, and the exhaust gas is not sampled. Therefore, the mixed gas at the time of calibration or purge does not include the exhaust gas, and becomes the calibration gas or the purge gas itself, and the gas supplied to the diluter MIX also becomes the calibration gas or the purge gas itself.

Thereafter, the control device 20 determines whether an end signal that ends the calibration or the purge is received (S6), and ends the calibration or the purge in a case where the end signal has been received.

In this way, by switching the opening and closing mechanism V1 to the closed state, sampling of the exhaust gas is started and the exhaust gas analysis is performed. By switching the opening and closing mechanism V1 to the closed state, sampling of the exhaust gas is stopped and the calibration gas or the purge gas is supplied to the sampling channel L1.

In the exhaust gas analyzing device 100 according to the embodiment configured as described above, the additional channel L3 through which the calibration gas or the purge gas flows is connected to upstream of the pump P in the recirculated channel L2, and thus the calibration gas or the purge gas can flow from the recirculated channel L2 into the sampling channel L1 with use of a negative pressure of the pump P by opening the opening and closing mechanism V1 of the additional channel L3. As a result, the analyzer X can be calibrated or the sampling channel L1 can be purged without removing the sampling probe of the sampling channel L1 from the sampling location.

In addition, since the control device 20 switches the opening and closing mechanism V1 to the open state or the closed state, the exhaust gas analysis and the calibration or purge is automatically switchable.

Furthermore, since the additional flow rate E is larger than the analysis gas flow rate A, and part of the calibration gas or the purge gas introduced from the additional channel L3 into the recirculated channel L2 flows backward through the diluter MIX in the sampling channel L1, the exhaust gas can be reliably prevented from flowing into the analyzer X, and calibration and purge can be appropriately performed.

Since the additional channel L3 is connected between the pump P and the first filter F1 in the recirculated channel L2, the dilution gas in which the particulate matter is captured from the exhaust gas flows through a connection of the additional channel L3 at the time of exhaust gas analysis, and contamination of the additional channel L3 can be reduced.

In addition, since the dehumidifier 12 is provided downstream of the pump P in the recirculated channel L2, the calibration gas or the purge gas can be dried and allowed to flow, and this can suppress condensation of moisture contained in these gases.

Note that the present invention is not limited to the embodiment.

Figure 6:
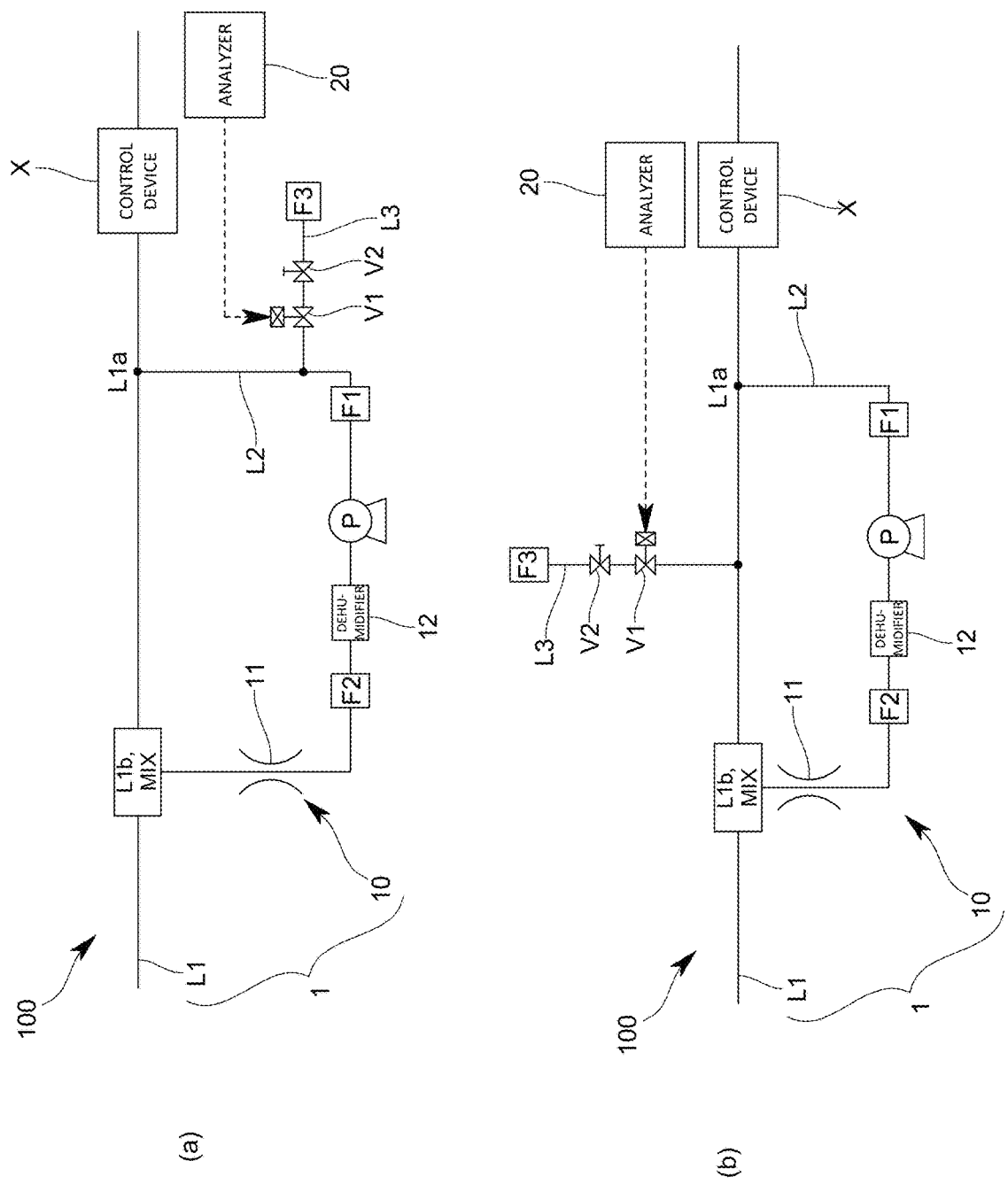
FIG. 6 is a schematic diagram illustrating a configuration of an exhaust gas analyzing device according to another embodiment.

For example, the connection of the additional channel L3 is between the first filter F1 and the pump P in the embodiment, but may be between the branch point L1a and the first filter F1 as illustrated in FIG. 6(a).

Alternatively, as illustrated in FIG. 6(b), the connection of the additional channel L3 may connect the additional channel L3 between the diluter MIX and the branch point L1a in the sampling channel L1 (including the diluter MIX and the branch point L1a in this concept).

Figure 7:
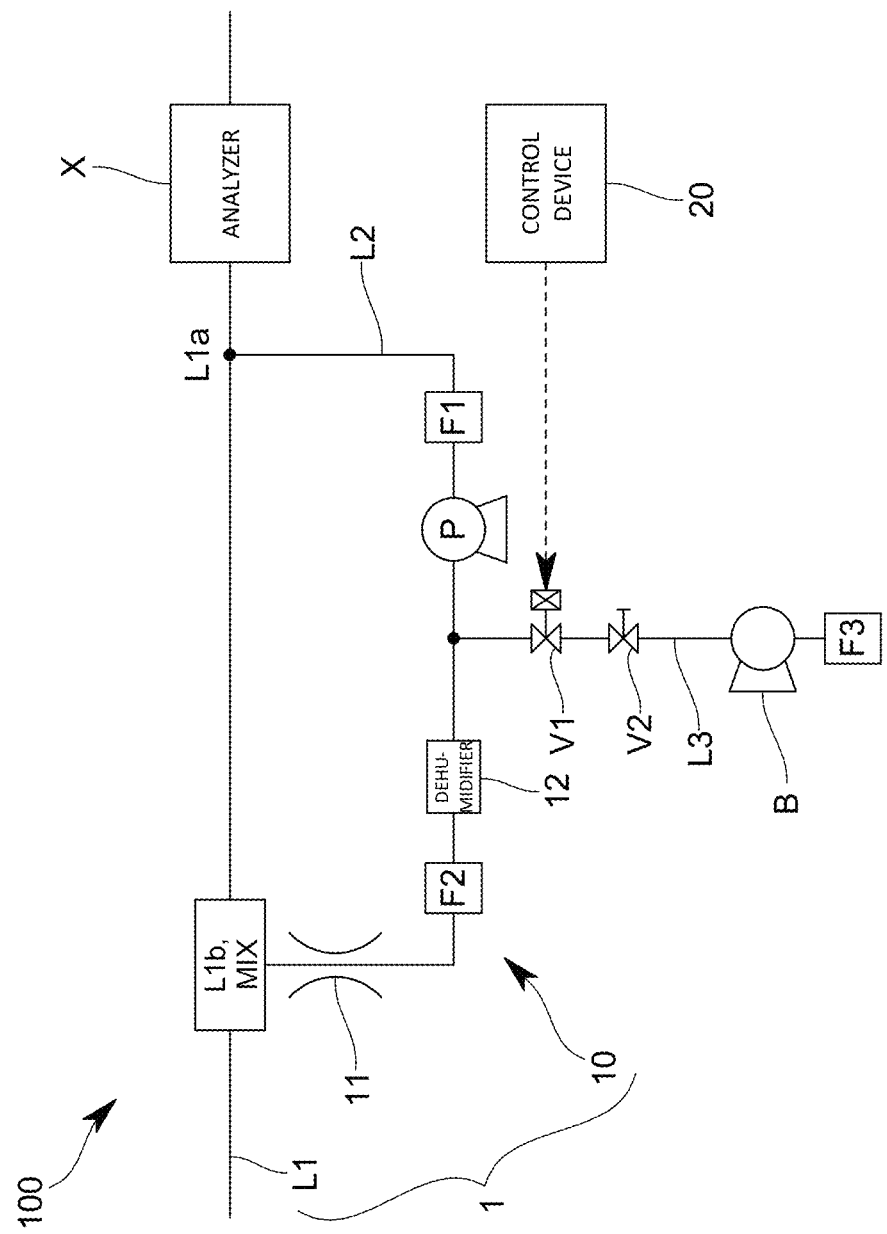
FIG. 7 is a schematic diagram illustrating a configuration of an exhaust gas analyzing device according to another embodiment.

Furthermore, as shown in FIG. 7, in a case where the additional channel L3 is provided with a pressure feeder B, the connection of the additional channel L3 may be downstream of the pump P in the recirculated channel L2.

Figure 8:
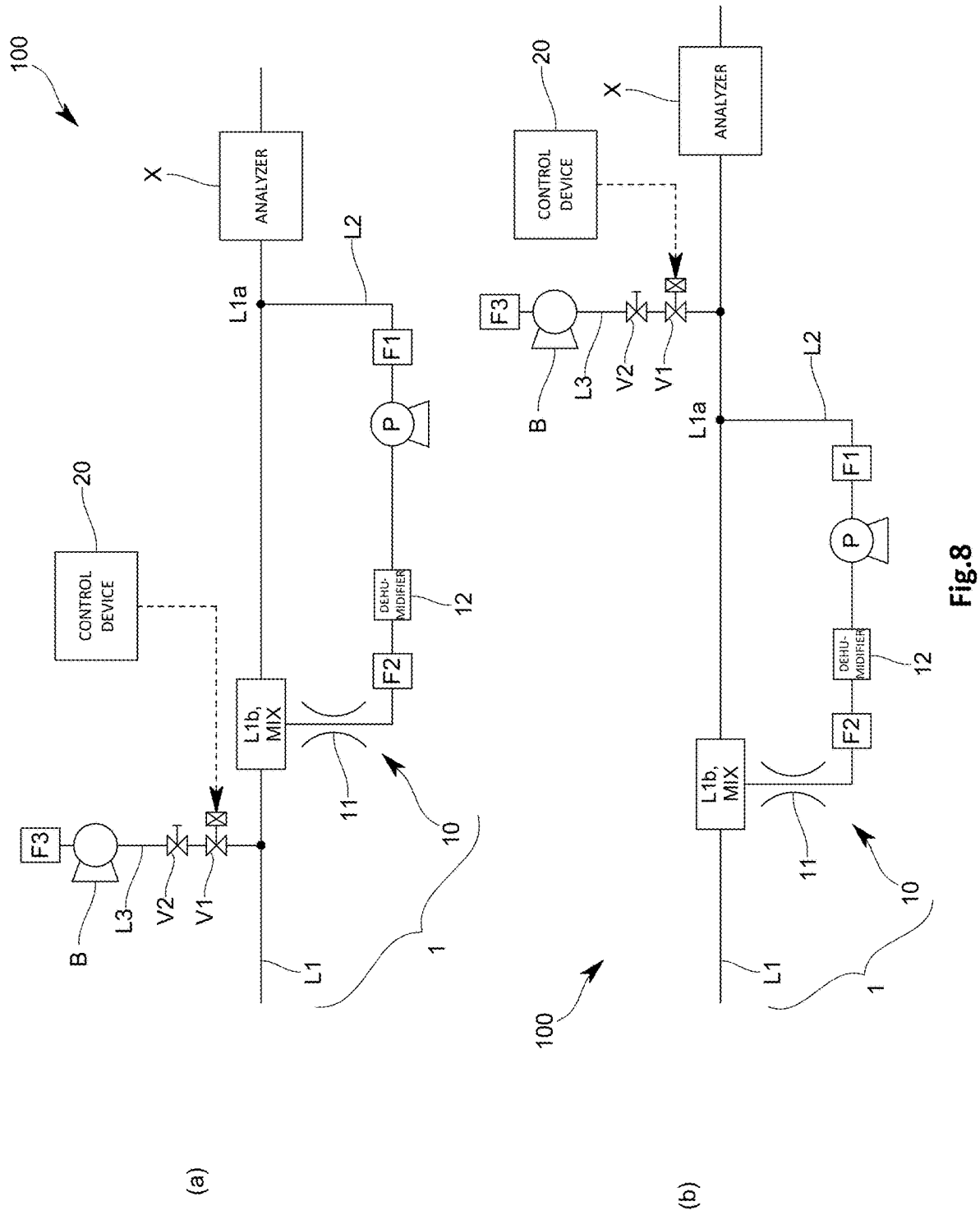
FIG. 8 is a schematic diagram illustrating a configuration of an exhaust gas analyzing device according to another embodiment.

In addition, in a case where the additional channel L3 is provided with the pressure feeder B as shown in FIG. 8(a), the connection of the additional channel L3 may be upstream of the diluter MIX in the sampling channel L1, or may be between the branch point L1a and the analyzer X as shown in FIG. 8(b).

The calibration start signal and the purge open signal are different signals, and the calibration and the purge can be performed as different operations. However, the calibration and the purge may be performed at once by one operation.

Further, the calibration gas according to the embodiment is the zero gas for the zero check, but may be, for example, a span calibration gas having a known concentration.

Furthermore, the opening and closing mechanism V1 is an opening and closing valve such as an electromagnetic valve controlled by the control device 20 in the embodiment, but the opening and closing mechanism V1 may be manually switchable to an open state or a closed state by a user. Examples of such a component include a component that is switchable to an open state or a closed state, for example, by removal of a cap provided in the additional channel L3.

Further, the additional channel L3 may be provided with a needle valve or a flow rate control valve to adjust the additional flow rate.

Figure 9:
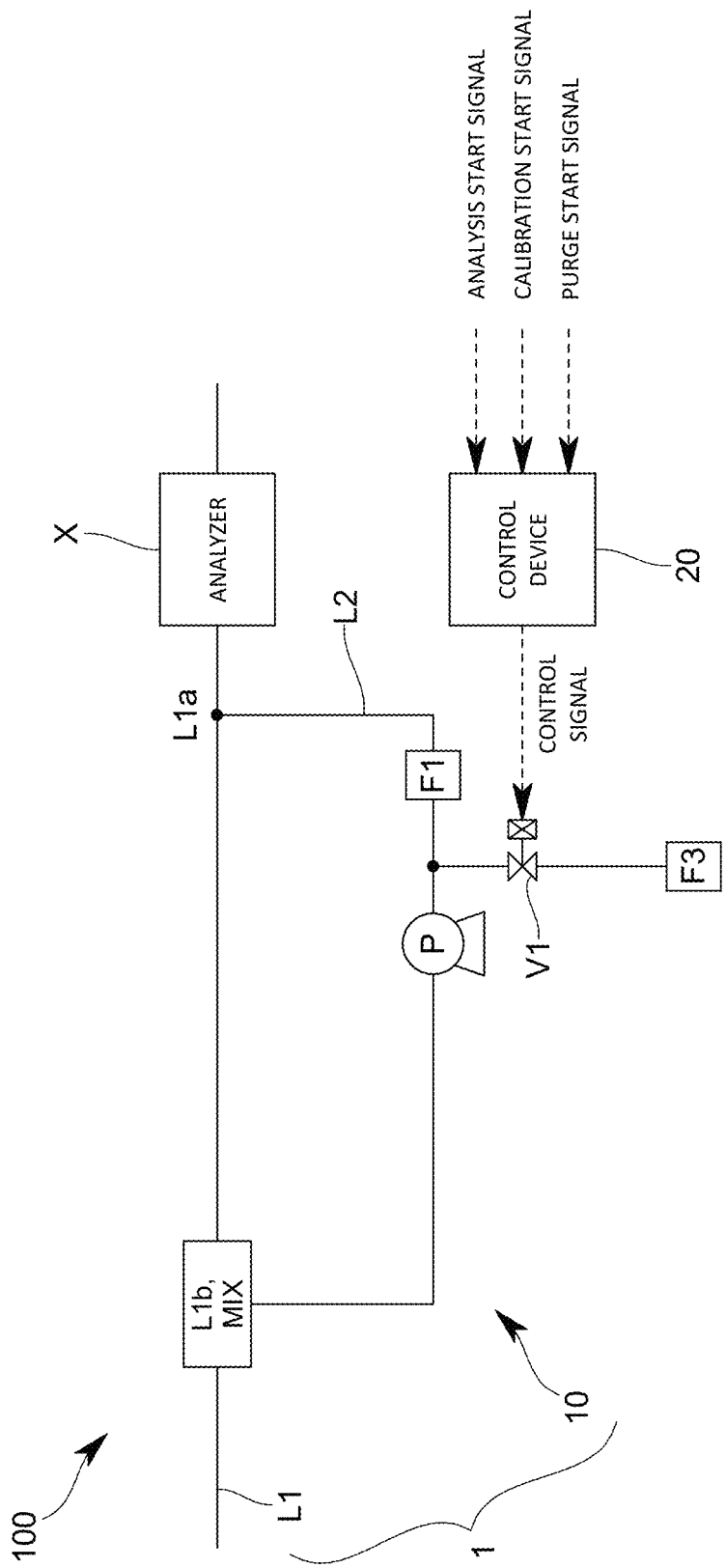
FIG. 9 is a schematic diagram illustrating a configuration of an exhaust gas analyzing device according to another embodiment.

In addition, as the exhaust gas analyzing device 100 of the present invention, the venturi as the flow rate controller 11, the second filter F2, the dehumidifier 12, and the flow rate adjusting valve V2 as the flow rate controllers described in the embodiment are not necessary, and one, a plurality, or all of these components may be eliminated as illustrated in FIG. 9. In this case, the first filter F1 may be provided upstream or downstream of the pump P in the recirculated channel L2.

In addition, the analyzer X is not limited to the CPC for measuring the number of particles of the particulate matter contained in the exhaust gas, and may measure an amount (PM) of the particulate matter.

The analyzer X may analyze various components contained in the exhaust gas, such as carbon monoxide (CO), carbon dioxide ($CO_2$), nitrogen oxide ($NO_x$), or hydrocarbon (HC). In this case, in a case where an exhaust gas cleaner such as a scrubber is provided instead of the first filter F1 or the second filter F2 according to the embodiment, the exhaust gas introduced into the recirculated channel L2 can be supplied to the diluter MIX as a dilution gas.

The present invention is not limited to the embodiment, and it goes without saying that various modifications can be made without departing from the gist of the present invention.

INDUSTRIAL APPLICABILITY

The present invention configured as described above allows the analyzer to be calibrated or the sampling channel to be purged without removing the sampling probe from the sampling location.

The invention claimed is:

1. An exhaust gas analyzing device comprising:
   a sampling channel through which an exhaust gas from an internal combustion engine flows;
   an analyzer that is connected to the sampling channel and analyzes particulate matter in the exhaust gas;
   a diluter provided upstream of the analyzer in the sampling channel;
   a recirculation channel that branches from a branch point set between the analyzer and the diluter in the sampling channel, joins the diluter, and directs part of the exhaust gas flowing through the sampling channel from downstream to upstream of the sampling channel;
   a pump that is provided in the recirculation channel to move the part of the exhaust gas flowing through the sampling channel toward the analyzer from downstream to upstream of the sampling channel by returning the part of the exhaust gas from the branch point to the diluter through the recirculation channel;
   an additional channel that is connected to the recirculation channel or the sampling channel and through which a calibration gas or a purge gas flows; and
   an opening and closing mechanism provided in the additional channel, wherein an additional flow rate as a flow rate of the calibration gas or the purge gas introduced from the additional channel into the recirculation channel or the sampling channel is larger than an analysis gas flow rate as a flow rate of a gas introduced into the analyzer, and wherein the recirculation channel is provided with a first filter that captures the particulate matter.

2. The exhaust gas analyzing device according to claim 1, wherein when the opening and closing mechanism is opened, part of the calibration gas or the purge gas introduced from the additional channel into the recirculation channel flows to upstream of the sampling channel through the diluter.

3. The exhaust gas analyzing device according to claim 1, wherein an additional flow rate as a flow rate of the calibration gas or the purge gas introduced from the additional channel into the recirculation channel is smaller than a supply flow rate as a flow rate of a gas supplied from the recirculation channel to the diluter.

4. The exhaust gas analyzing device according to claim 1, wherein the analyzer analyzes a component contained in the exhaust gas in a state where the opening and closing mechanism is closed, and the calibration gas or the purge gas flows through the additional channel in a state where the opening and closing mechanism is opened.

5. The exhaust gas analyzing device according to claim 1, wherein the recirculation channel is provided with a first filter that captures the particulate matter.

6. The exhaust gas analyzing device according to claim 5, wherein the first filter is provided upstream of the pump in the recirculation channel.

7. The exhaust gas analyzing device according to claim 6, wherein the additional channel is connected between the pump and the first filter in the recirculation channel.

8. The exhaust gas analyzing device according to claim 1, wherein the additional channel is provided with a filter that captures a particulate matter in an atmosphere, and the atmosphere having passed through the filter as the calibration gas or the purge gas is introduced into the recirculation channel or the sampling channel from the additional channel in a state where the opening and closing mechanism is opened.

9. The exhaust gas analyzing device according to claim 1, further comprising a dehumidifier provided downstream of the pump in the recirculation channel.

10. A method of supplying a gas to an exhaust gas analyzing device including a sampling channel through which an exhaust gas from an internal combustion engine flows, an analyzer that is connected to the sampling channel and analyzes particulate matter in the exhaust gas, a diluter provided upstream of the analyzer in the sampling channel, a recirculation channel that branches from a branch point set downstream of the diluter in the sampling channel, is connected to the diluter, and directs part of the exhaust gas flowing through the sampling channel toward the analyzer from downstream to upstream of the sampling channel, and a pump that is provided in the recirculation channel to move the part of the exhaust gas flowing through the sampling channel from downstream to upstream of the sampling channel by returning the part of the exhaust gas from the branch point to the diluter through the recirculation channel, the method comprising:

connecting an additional channel through which a calibration gas or a purge gas flows to the recirculation channel or the sampling channel, and guiding the calibration gas or the purge gas to the sampling channel by opening an opening and closing mechanism provided in the additional channel, wherein an additional flow rate as a flow rate of the calibration gas or the purge gas introduced from the additional channel into the recirculation channel or the sampling channel is larger than an analysis gas flow rate as a flow rate of a gas introduced into the analyze, and wherein the recirculation channel is provided with a first filter that captures the particulate matter.

11. An exhaust gas analyzing device comprising:

a sampling channel through which an exhaust gas from an internal combustion engine flows;

an analyzer that is connected to the sampling channel and analyzes particulate matter in the exhaust gas;

a diluter provided upstream of the analyzer in the sampling channel;

a recirculation channel that branches from a branch point set between the analyzer and the diluter in the sampling channel, joins the diluter, and directs part of the exhaust gas flowing through the sampling channel from downstream to upstream of the sampling channel;

a pump that is provided in the recirculation channel to move the part of the exhaust gas flowing through the sampling channel toward the analyzer from downstream to upstream of the sampling channel by returning the part of the exhaust gas from the branch point to the diluter through the recirculation channel;

an additional channel that is connected to the recirculation channel or the sampling channel and through which a calibration gas or a purge gas flows; and an opening and closing mechanism provided in the additional channel, wherein an additional flow rate as a flow rate of the calibration gas or the purge gas introduced from the additional channel into the recirculation channel is larger than an analysis gas flow rate as a flow rate of a gas introduced into the analyzer, and wherein the recirculation channel is provided with a first filter that captures the particulate matter.

\* \* \* \* \*